United States Patent [19]

Tsutsui et al.

[11] Patent Number: 4,659,795
[45] Date of Patent: Apr. 21, 1987

[54] PROCESS FOR PRODUCING POLYMERIC RESIN

[75] Inventors: Koichi Tsutsui, Yawata; Yoshio Eguchi, Ikeda; Hiroyoshi Kataoka, Toyonaka, all of Japan

[73] Assignee: Nippon Paint Co., Ltd., Osaka, Japan

[21] Appl. No.: 493,046

[22] Filed: May 13, 1983

Related U.S. Application Data

[63] Continuation of Ser. No. 281,209, Jul. 6, 1981, abandoned, which is a continuation of Ser. No. 83,944, Oct. 11, 1979, abandoned, which is a continuation of Ser. No. 960,560, Nov. 14, 1978, abandoned, which is a continuation of Ser. No. 852,966, Nov. 18, 1977, abandoned, which is a continuation of Ser. No. 757,502, Jan. 7, 1977, abandoned, which is a continuation of Ser. No. 624,574, Oct. 21, 1975, abandoned, which is a continuation of Ser. No. 391,756, Aug. 27, 1973, abandoned.

[30] Foreign Application Priority Data

Aug. 25, 1972 [JP] Japan ................................. 47-85036
Feb. 20, 1973 [JP] Japan ................................. 48-20575

[51] Int. Cl.$^4$ .................. C08F 265/02; C08F 267/02; C08G 18/81
[52] U.S. Cl. ..................................... 526/301; 526/75; 526/312; 528/45
[58] Field of Search ............ 526/301, 312, 344, 307.3, 526/75; 528/45

[56] References Cited

U.S. PATENT DOCUMENTS

| | | | |
|---|---|---|---|
| 2,882,260 | 4/1959 | Bartl et al. | 526/301 |
| 3,297,745 | 1/1967 | Feketz et al. | 526/301 |
| 3,299,001 | 1/1967 | Suling et al. | 526/304 |
| 3,499,852 | 3/1970 | Schroeder et al. | 260/18 TN |
| 3,542,739 | 11/1970 | Krimm et al. | 526/301 |
| 3,567,695 | 3/1971 | Brotherton et al. | 526/301 |
| 3,659,003 | 4/1972 | Johnston et al. | 528/45 |
| 3,692,746 | 4/1972 | Woo et al. | 526/301 |
| 3,694,415 | 9/1972 | Honda et al. | 528/46 |
| 3,694,416 | 9/1972 | Rubens et al. | 526/301 |
| 3,759,809 | 9/1973 | Caruck et al. | 204/159.15 |
| 4,034,017 | 7/1977 | Chang et al. | 528/45 |
| 4,098,844 | 7/1978 | Tsugukuni et al. | 524/440 |
| 4,215,175 | 7/1980 | Tucker | 428/288 |

FOREIGN PATENT DOCUMENTS 34708 11/1970 Japan.

*Primary Examiner*—Herbert J. Lilling
*Attorney, Agent, or Firm*—Wenderoth, Lind & Ponack

[57] ABSTRACT

A process for producing a polymeric resin suitable for the use as a solution or powder paint, which comprises polymerizing a blocked isocyanate group-containing ethylenically unsaturated polymerizable compound with an active hydrogen atom-containing ethylenically unsaturated polymerizable compound.

1 Claim, No Drawings

PROCESS FOR PRODUCING POLYMERIC RESIN

This application is a continuation of now abandoned application Ser. No. 281,209, filed July 6, 1981, now abandoned, which is a continuation of Ser. No. 083,944, filed Oct. 11, 1979, now abandoned, which in turn is a continuation of application Ser. No. 960,560, filed Nov. 14, 1978, now abandoned, which in turn is a continuation of application Ser. No. 852,966, filed Nov. 18, 1977, now abandoned, which in turn is a continuation of Ser. No. 757,502, filed Jan. 7, 1977, now abandoned, which in turn is a continuation of Ser. No. 624,574, filed Oct. 21, 1975, now abandoned, which in turn is a continuation of Ser. No. 391,756, filed Aug. 27, 1973, now abandoned.

The present invention relates to a process for preparing a self-hardening resin. More particularly, it relates to a process for preparing a self-hardening resin having an active hydrogen atom and a blocked isocyanate group and being useful as a coating material, especially as a paint.

As a paint utilizing the reactivity of an isocyanate group, there is known an urethane resin paint which is, in case of solution type, usually employed in a two-component system due to the high reactivity of the isocyanate group. Such two-component type paint is disadvantageous in requiring a troublesome operation for mixing of the components instantly before the use and showing a relatively large deterioration with time on the storage. In order to overcome these disadvantages, there has been proposed a one-component system paint comprising a resin wherein all the isocyanate groups are blocked provisionally with a phenol or any other blocking agent and recovered by heating on the use so as to cause a desired urethane reaction for hardening. However, a blocked isocyanate group-containing compound is not always sufficiently compatible with any other co-existing resin. Further, the kind of the solvent to be used is quite restricted. Furthermore, the surface state of the coating film formed therewith is not satisfactory.

In case of powder type, a resin wherein all the isocyanate groups are provisionally blocked as above is admixed with an active hydrogen atom-containing resin (e.g. acryl polyol resin, polyester polyol resin), and the resulting mixture is applied on the surface of a substrate and then hardened by heating. On mixing, however, the resins are required to be molten, from which a three dimensional structure is apt to be formed. Further, in the course of the application process, there may be formed a partial gel structure, which makes the surface state of the resulting coating film rough. In alternative, the mixation may be carried out in a solid state, but a uniform dispersion is hardly assured so that a partial gel formation occurs on baking to impart an inferior solvent resistance to the resulting coating film.

For overcoming the drawbacks present in conventional paints as above, an extensive study has been made. As the result, it has been found that a self-hardening resing having an active hydrogen atom and a blocked isocyanate group is soluble in a wide variety of solvents so that a uniform solution of such resin is readily obtainable. It has also been found that the resulting resin solution can afford a coating film of good surface state when applied on the surface of a substrate. Thus, the said self-hardening resin is quite suitable for the use as a solution paint. Since the said resin is self-hardening, the production of a powder paint therewith is much simplified. Further, the resin is advantageously uniform and transparent before and after hardening, and a hardened coating film made of the resin is excellent in solvent resistance and chemical resistance. Thus, it is also suitable for use as a powder paint.

In order to produce a self-hardening resin of the said type, there may be considered the adoption of the reaction between a polyisocyanate compound having a free isocyanate group and a blocked isocyanate group, i.e. a partially blocked polyisocyanate compound, and a polymer having an active hydrogen atom. However, the reaction can proceed with much difficulty in a solvent active to a free isocynate group. Further, the use of the partially blocked polyisocyanate compound having a higher content of isocyanate groups as well as the production of the polymer having an active hydrogen atom employing a higher proportion of an active hydrogen atom-containing polymerizable monomer are required for attaining a higher crosslinkage in the coating film resulting formed the resin. But, the reaction can not readily proceed in these cases.

According to the present invention, the said self-hardening resin is produced by polymerizing a blocked isocyanate group-containing ethylenically unsaturated polymerizable compound (hereinafter referred to as "component A") with an active hydrogen atom-containing ethylenically unsaturated polymerizable compound (hereinafter referred to as "component B"), if necessary, in the presence of an ethylenically unsaturated monomer copolymerizable with the components A and B (hereinafter referred to as "component C"). Preferably, the component A and the component B are reacted in a proportion of 0.2 to 2 of the blocked isocyanate groups in the former to one active hydrogen atom in the latter.

The component A may be the one prepared, for instance, by (1) subjecting a polyisocyanate compound having isocyanate groups partly blocked and an active hydrogen atom-containing ethylenically unsaturated monomer to addition or (2) reacting an isocyanate group-containing ethylenically unsaturated monomer with a blocking agent for the isocyanate group.

In the above procedure (1), the polyisocyanate compound and the active hydrogen atom-containing ethylenically unsaturated monomer may be reacted in a proportion of one isocyanate group in the former and one active hydrogen atom in the latter, preferably in the presence of a polymerization inhibitor (e.g. hyroquinone, p-benzoquinone) for prevention of the thermal polymerization of the said ethylenically unsaturated monomer.

As the polyisocyanate compound, there may be used the one by reacting a polyisocyanate such as a diisocyanate, a triisocyanate, an addition product of a low molecular polyol to a polyisocyanate, a polyisocyanate of biuret structure of a polyisocyanate of allophanate structure with a blocking agent containing an active hydrogen atom in a proportion of 0.01 to 0.8, preferably 0.1 to 0.7 of the active hydrogen atom in the blocking agent to one isocyanate group in the polyisocyanate in the presence or absence of an appropriate inert solvent (e.g. toluene, xylene, butyl acetate, methylethylketone) and/or of a suitable basic catalyst (e.g. triethylamine, N-methylmorpholine) or a metal catalyst (e.g. dibutyltin dilaurate, stannous chloride) at a temperature of room temperature to 100° C., preferably of 50° to 80° C. The reaction product wherein a certain amount of the polyisocyanate as unreacted remains may be employed as such or after purification, for instance, by extraction, distillation or adsorption.

Specific examples of the polyisocyanate as employed above are as follows: hexamethylene diisocyanate, ethylene diisocyanate, propylene diisocyanate, tetramethylene diisocyanate, decamethylene diisocyanate, triphenylmethane triisocyanate, 4,4'-ethylene-bis(cyclohexylisocyanate), 4,4'-methylene-bis(cyclohexylisocyanate), ω, ω'-diisocyanato-1,3-dimethylbenzene, phenylene diisocyanate, tolylene diisocyanate, lysine diisocyanate methyl ester, isophorone diisocyanate, trimethylhexamethylene diisocyanate, diphenylmethane-4,4'-diisocyanate, 3,3'-dimethyldiphenylmethane-4,4'-diisocyanate, etc. Adducts of these polyisocyanates with low molecular polyols such as ethylene glycol, diethylene glycol, propylene glycol, trimethylolpropane, hexamethylene glycol, 1,3-butylene glycol, cyclohexanedimethanol, neopentyl glycol or pentaerythritol, polyisocyanates of biuret structure, polyisocyanates of allophanate structure and the like may be also used. These polyisocyanates may be used alone or in combination.

As the blocking agent, there may be employed any compound which is conventionally employed for blocking an isocyanate group and, on heating, can recover a free isocyanate group from the blocked isocyanate group therewith. Specific examples are phenols (e.g. phenol, cresol, nitrophenol, ethylphenol), lactams (e.g. ε-caprolactam, δ-valerolactam, γ-butyrolactam, β-propionlactam), active methylene compounds (e.g. ethyl acetoacetate, diethyl malonate, acetylacetone), alcohols (e.g. methanol, ethanol, n-propanol, n-butanol, t-butanol, isobutanol, n-amyl alcohol, lauryl alcohol, ethylene glycol monomethyl ether, glycolic ester, lactic acid, ethylene chlorohydrin, ethylene bromohydrin), acid amides (e.g. acetanilide, benzamide, acetamide, stearic acid amide), imides (e.g. succinimide, phthalimide, maleimide), amines (e.g. aniline, diphenylamine, phenylnaphthylamine, butylamine), imidazoles (e.g. imidazole), ureas (e.g. urea, thiourea, ethyleneurea), imines (e.g. ethyleneimine), oximes (e.g. acetoxime, methylethylketoxime, benzophenonoxime, cyclohexanonoxime), etc.

Examples of the active hydrogen atom-containing ethylenically unsaturated monomer are unsaturated hydroxyl compounds (e.g. 2-hydroxyethyl methacrylate, 2-hydroxypropyl methacrylate, 2-hydroxyethyl acrylate), unsaturated carboxylic acids (e.g. acrylic acid, itaconic acid, methacrylic acid, crotonic acid, maleic acid), unsaturated acid amides (e.g. acrylamide, N-methylolacrylamide, methacrylamide), etc.

In the above procedure (2), the isocyanate group-containing ethylenically unsaturated monomer and the blocking agent may be reacted in a proportion of one isocyanate group in the former to one active hydrogen atom in the latter, preferably in the presence of a small amount of a conventional polymerization inhibitor (e.g. hydroquinone, p-benzoquinone) for prevention of the thermal polymerization of the ethylenically unsaturated monomer.

As the said ethylenically unsaturated monomer, there may be employed vinyl isocyanate, methyl acrylate isocyanate, etc. There may be also employed the addition product of the said polyisocyanate to the active hydrogen atom-containing ethylenically unsaturated monomer as prepared, for instance, in the substantially same manner as above but using an active hydrogen atom-containing ethylenically unsaturated monomer as the blocking agent.

The reaction product wherein the unreacted polyisocyanate and/or the by-produced totally blocked polyisocyanate are present may be used as such or after purification, for instance, by extraction, distillation or adsorption.

The component B to be polymerized with the component A may be an unsaturated hydroxyl compound, an unsaturated carboxylic acid, an unsaturated acid amide or the like as used in the production of the component A.

As the component C, there may be used, for instance, acrylic esters (e.g. ethyl acrylate, n-butyl acrylate, 2-ethylhexyl acrylate), methacrylic esters (e.g. methyl methacrylate, ethyl methacrylate, n-butyl methacrylate, n-lauryl methacrylate, isobutyl methacrylate), maleic esters (e.g. dibutyl maleate, diethyl maleate), fumaric esters (e.g. diethyl fumarate, dibutyl fumarate), styrene and its derivatives (e.g. α-methylstyrene, β-chlorostyrene, α-bromostyrene, p-bromostyrene), vinyl esters (e.g. vinyl acetate, vinyl propionate, vinyl isopropionate), unsaturated nitriles (e.g. acrylonitrile, methacrylonitrile, ethylacrylonitrile), mercapto group-containing cellulose derivatives, mercapto group-containing polyester resins, etc.

For the polymerization, there may be adopted any conventional procedure such as solution polymerization, bulk polymerization, suspension polymerization or emulsion polymerization.

In solution polymerization, the concentration of the total monomers in a solvent which may be the one as conventionally employed for a coating composition or as readily removable is usually from 5 to 90% by weight, preferably from 20 to 70% by weight. As the polymerization initiator, there may be employed an oil-soluble free radical initiator such as an azo compound (e.g. α,α'-azobisisobutyronitrile) or a peroxide (e.g. benzoyl peroxide, t-butyl hydroperoxide, cumene hydroperoxide). There may be also employed as redox system catalyst wherein a reductive substance is employed together. The said polymerization initiator may be used in an amount of 0.1 to 10% by weight, preferably 0.5 to 7% by weight on the basis of the total weight of the copolymerizable compounds, i.e. the components A and B, if present, with the component C. Further, a conventional chain transfer agent such as a mercaptan (e.g. laurylmercaptan, t-dodecylmercaptan), a disulfide (e.g. diisopropylxanthogenedisulfide), a diazothioether or a halide may be used in an amount of not more than 8% by weight, preferably 0.01 to 6% by weight based on the total weight of the copolymerizable compounds. The polymerization temperature may be from 50° to 100° C.

Bulk polymerization may be carried out in the substantially same manner as in solution polymerization but no solvent is used. Since the produced polymer tends to have a larger molecular weight, an appropriate control of the amount of the polymerization initiator and the chain transfer agent may be necessary.

In suspension polymerization, there may be employed any polymerization initiator and chain transfer agent as used in solution polymerization. Usually, the polymerization initiator and the chain transfer agent are used respectively in amounts of 0.5 to 12% by weight and of not more than 10% by weight based on the total weight of the copolymerizable compounds. As a dispersing agent, there may be employed usually a water-soluble high molecular compound and/or an inorganic compound difficulty soluble in water. Examples of the water-soluble high molecular compound are natural or artificial high molecular compounds such as gelatin, tragacanth, starch, methylcellulose, carboxylmethylcellulose, their derivatives, polyvinyl alcohol, partially saponified polyvinyl acetate, other vinyl alcohol copolymers and salts of polyacrylic acid. Examples of the inorganic compound are salts such as barium sulfate, calcium sulfate, calcium carbonate, magnesium carbonate and calcium phosphate, inorganic high molecular compounds such as talc, bentonite, silicic acid, diatomaceous earth and clay, metal oxides, etc. As a dispersing supplement, there may be used salts such as sodium chloride, potassium chloride, sodium sulfate, disodium hydrogenphosphate, etc. Surfactants may be also employed. The temperature for polymerization is usually from 40° to 100° C., preferably from 50° to 80° C.

In emulsion polymerization, there is usually employed a water-soluble free radical initiator such as potassium persulfate, ammonium persulfate, hydrogen peroxide, sodium perborate, cumene hydroperoxide or any other peroxide. There may be also employed any redox system catalyst with a reductive substance such as a saccharide, rongalit, an iron salt or oxalic acid. The said catalyst is used usually in an amount of 0.01 to 10% by weight, preferably in an amount of 0.05 to 5% by weight based on the total weight of the copolymerizable compounds. The addition of a small amount of a chain transfer agent as in solution polymerization as well as a weak basic salt (e.g. sodium carbonate, sodium acetate) as a polymerization degree elevating agent to the reaction system is favored. As an emulifier, there may be used an anionic surfactant (e.g. sodium alkylarylsulfonate, sodium alkylsulfate, sodium alkylaryl-polyethersulfonate), a non-ionic surfactant (e.g. polyethyldiglycol), a cationic surfactant or the like. As a protective collid, there may be used polyvinyl alcohol, hydroxyethylcellulose, polyacrylic acid or the like. The temperature for polymerization is usually from 40° to 100° C., preferably from 50° to 80° C.

The self-hardening resin of the invention can be used as an essential component in a paint composition. When used in the form of a solution paint composition, there is favorably employed the resin obtained by solution polymerization. It can be used alone as a clear paint or in combination with any conventional component for a paint composition. Examples of such component are reactive or non-reactive resins (e.g. polyamines, polyamides, epoxy resins, aminoblasts, petrolic resins), pigments (e.g. titanium white, iron oxide, silica, calcium carbonate, barium sulfate, carbon black, phthalocyanine blue, cinquasia red), plasticizers (e.g. dibutyl phthalate, dioctyl phthalate), cellulose derivatives (e.g. cellulose acetate butyrate, methoxycellulose, ethoxycellulose), anionic surfactants (e.g. fatty acid salts, higher alcohol sulfates), non-ionic surfactants (e.g. polyoxyethylene alkyl ethers), cationic surfactants (e.g. alkylamine salts, quaternary ammonium salts), levelling agents (e.g. silicone resin, acrylic resin), low temperature curing catalysts (e.g. triethylamine, dibutyltin dilaurate), etc.

The thus obtained paint composition may be applied on the surface of a substrate and baked at a temperature of 100° to 300° C. for a period of 30 seconds to 30 minutes, preferably at a temperature of 100° to 200° C. for a period of 10 to 30 minutes to form a coating film. The coating film is excellent in the surface state and the chemical resistance.

When the self-hardening resin of the invention is used as a powder paint, the resin obtained by solution polymerization is dried by the use of a conventional drying apparatus such as a reduced pressure dryer, a hot air dryer or a spray dryer. In case of the resin being the one obtained by suspension polymerization or emulsion polymerization, it may be dehydrated and then dried by the use of a conventional drying apparatus such as a gas stream dryer, a hot air dryer or a fluidizing bed dryer. The resin obtained by bulk polymerization may be employed as such.

The thus obtained resin may be used itself as a clear paint or in combination with any conventional component as mentioned in connection with a solution paint composition. The blending of the conventional component may be carried out by a conventional procedure such as dry blending, semi-dry blending or melt blending. The thus obtained resin or its mixture with any other component is crushed and pulverized, and the resulting powder is applied on the surface of a substrate by a conventional procedure such as electrostatic coating process or fluidized bed coating process. The resulting surface is then subjected to baking, for instance, by heating at a temperature of 100° to 220° C., preferably of 140° to 200° C., for a period of 5 to 60 minutes to make a hardened coating film which is excellent in the solvent resistance and the chemical resistance.

Practical and presently preferred embodiments of the present invention are illustratively shown in the following Examples wherein part(s) are by weight:

EXAMPLE 1

(1-1) Preparation of partially blocked polyisocyanate compound:

In a flask, there is charged hexamethylene diisocyanate (336 parts), and methylethylketone oxime (174 parts) is dropwise added thereto in 3 hours at 70° C. After the dropwise addition is completed, the resultant mixture is heated at the same temperature as above for 2 hours. The reaction mixture is washed with a mixture of n-hexane and benzene (3:1 by weight) to extract unreacted diisocyanate. The residue is dissolved in butyl acetate, and insoluble materials are eliminated to give a solution of methylethylketone oxime-monoblocked diisocyanate in butyl acetate.

(1-2) Preparation of blocked isocyanate group-containing ethylenically unsaturated compound:

In a flask, there are charged the solution obtained in the above (1-1) (193 parts) and p-benzoquinone (0.01 part), and 2-hydroxyethyl methacrylate (65 parts) is dropwise added thereto in 2 hours at 60° C. under nitrogen stream. After the dropwise addition is completed, the resultant mixture is heated at the same temperature as above for 8 hours to give a yellowish brown, viscous solution of the resultant blocked isocyanate group-containing ethylenically unsaturated compound.

(1-3) Preparation of blocked isocyanate group-containing self-hardening resin:

In a flask, methyl methacrylate (53.5 parts), styrene (10 parts), n-butyl acrylate (20 parts), 2-hydroxyethyl methacrylate (7.5 parts), laurylmercaptan (2 parts), butyl acetate (48 parts) and the solution obtained in the above 1-2) (30 parts) are charged, and the resulting mixture is heated at 80° C. Under nitrogen stream, a solution of α,α'-azobisisobutyronitrile (2 parts) in butyl acetate (50 parts) is dropwise added thereto in 3 hours, and heating is continued at the same temperature as above for 5 hours whereby the conversion reaches to 100% and a solution containing 50% by weight of the resin is obtained. The viscosity is V-W, and the weight average molecular weight is 26,000.

The resin recovered from the above obtained solution is soluble in ethyl acetate, cellosolve acetate, toluene, xylene and methylethylketone. When such solution is applied on a glass plate and baked, there is formed a transparent coating film.

(1-4) Preparation of paint composition:

The resin solution obtained in the above (1-3) (100 parts) and rutile type titanium oxide (50 parts) are mixed together in a sand grind mill (SG mill) for 2 hours. The resulting paint composition is applied on a metal plate and heated at 180° C. for 30 minutes to give a coating film excellent in surface state, gloss, chemical resistance and mechanical properties.

The test results on the coating film are as shown in Table 1.

TABLE 1

| Items | Results | Remarks |
| --- | --- | --- |
| Gloss | 90 | Reflected by 60° mirror surface |
| Surface state | Good | |
| Hardness | 29 | Sword-Rocker value (standard plate: glass plate, 62; polymethyl methacrylate plate, 23) |
| Impact resistance | 50 cm | Du Pont's impact test (diameter, ½"; 500 g plumb fall distance) |
| Erichsen extrusion | 8 mm | |
| Chemical resistance | No change | Immersed in 5N NaOH for 24 hours |
| | No change | Immersed in $H_2SO_4$ for 24 hours |

Comparison

Hexmethylene diisocyanate (84 parts) and methylethylketone oxime (87 parts) are reacted to give a product which is sparingly soluble in an ordinary solvent (e.g. butyl acetate, ethyl acetate, methylethylketone, toluene) so that the manufacture of a paint composition with the same is difficult. The product is admixed with acryl polyol, and the resultant mixture is applied on an iron plate and baking is carried out at 180° C. for 30 minutes. On the surface, an insoluble portion remains and unevenness due to the inferior compatibility between the product and the acryl polyol.

EXAMPLE 2

(2-1) Preparation of partially blocked polyisocyanate compound:

In a flask, there are charged hexamethylene diisocyanate (336 parts), n-butanol (118 parts) and triethylamine (2.2 parts), and the resulting mixture is stirred at 80° C. for 5 hours. The reaction mixture is purified as in Example 1 to give a butylacetate solution of n-butanol-monoblocked diisocyanate.

(2-2) Preparation of blocked isocyanate group-containing ethylenically unsaturated compound:

In a flask, there are charged the solution obtained in the above 2-1) (186 parts) and p-benzoquinone (0.01 part), and 2-hydroxyethyl methacrylate (65 parts) is dropwise added thereto at 70° C. in 2 hours under nitrogen stream. After the dropwise addition is completed, the resultant mixture is heated at the same temperature as above for 12 hours to give a pale yellow solution of the resultant blocked isocyanate group-containing ethylenically unsaturated compound.

(2-3) Preparation of blocked isocyanate group-containing self-hardening resin:

In a flask, methyl methacrylate (53.5 parts) styrene (10 parts), n-butyl acrylate (20 parts), N-methylolacrylamide (7.5 parts), laurylmercaptan (2 parts), butyl acetate (48 parts) and the solution obtained in the above (2-2) (29 parts) are charged, and a solution of $\alpha,\alpha'$-azobisisobutyronitrile (2 parts) in butyl acetate (50 parts) is dropwise added thereto. The reaction is carried out as in Example 1 to give a solution containing 50% by weight of the resin.

(2-4) Preparation of paint composition:

The resin solution obtained in the above (2-3) (100 parts), rutile type titanium oxide (50 parts) and dibutyltin dilaurate (0.7 part) are mixed together. The resulting paint composition is applied on a metal plate and heated at 180° C. for 30 minutes to give a coating film excellent in surface state and toughness.

EXAMPLE 3

(3-1) Preparation of partially blocked polyisocyanate compound:

As in Example 1, isophorone diisocyanate (333 parts), m-cresol (227 parts), butyl acetate (100 parts) and triethylamine (3 parts) are subjected to reaction. The reaction product is washed with n-hexane and purified as in Example 1 to give a butyl acetate solution of m-cresolmonoblocked diisocyanate.

(3-2) Preparation of blocked isocyanate group-containing ethylenically unsaturated compound:

In a flask, there are charged the solution obtained in the above (3-1) (230 parts) and p-benzoquinone (0.01 part), and 2-hydroxyethyl methacrylate (65 parts) is dropwise added thereto. The reaction is effected as in Example 1 to give a brown solution of the resultant blocked isocyanate group-containing ethylenically unsaturated compound.

(3-3) Preparation of blocked isocyanate group-containing self-hardening resin:

In a flask, methyl methacrylate (43.5 parts), styrene (10 parts), n-butyl acrylate (30 parts), 2-hydroxyethyl methacrylate (5.5 parts), methacrylic acid (2 parts), lauryl mercaptan (2 parts), butyl acetate (50 parts) and the solution obtained in the above (3-2) (34 parts) are charged, and the reaction is carried out as in Example 1 to give a solution containing 50% by weight of the resin. Viscosity, X. Weight average molecular weight, 29,000.

(3-4) Preparation of paint composition:

The resin solution obtained in the above (3-3) (100 parts), rutile type titanium oxide (50 parts) and dibutyltin dilaurate (0.7 part) are mixed together. The resulting paint composition is applied on a metal plate and heated at 160° C. for 30 minutes to give a coating film excellent in surface state, gloss, chemical resistance and mechanical properties.

The test results on the coating film are as shown in Table 2.

TABLE 2

| Items | Results | Remarks |
| --- | --- | --- |
| Gloss | 89 | Test methods and judgement are same as in Example 1. |
| Surface state | Good | |
| Hardness | 31 | |
| Impact resistance | 30 cm | |
| Erichsen extrusion | 6 mm | |

TABLE 2-continued

| Items | Results | Remarks |
|---|---|---|
| Chemical resistance | | |
| Alkali | No change | |
| Acid | No change | |

Comparison

Isophorone diisocyanate (111 parts) and m-cresol (108 parts) are reacted, and the resultant product is admixed with acryl polyol. The resulting mixture is applied on an iron plate, and baking is carried out at 160° C. for 30 minutes. Spots are seen on the surface, and the surface state is bad.

EXAMPLE 4

(4-1) Preparation of partially blocked polyisocyanate compound:

As in Example 1, diphenylmethane-4,4'-diisocyanate (500 parts), methylethylketone oxime (174 parts) and butyl acetate (50 parts) are subjected to reaction. The reaction product is purified as in Example 1 to give a butyl acetate solution of methylethylketone oxime-monoblocked diisocyanate.

(4-2) Preparation of blocked isocyanate group-containing ethylenically unsaturated compound:

In a flask, there are charged the solution obtained in the above (4-1) (234 parts) and p-benzoquinone (0.01 part), and 2-hydroxyethyl methacrylate (65 parts) is dropwise added thereto. The reaction is effected as in Example 1 to give a reddish brown solution of the resultant blocked isocyanate group-containing ethylenically unsaturated compound.

(4-3) Preparation of blocked isocyanate group-containing self-hardening resin:

In a flask, methyl methacrylate (53.5 parts), styrene (10 parts), n-butyl acrylate (20 parts), 2-hydroxyethyl methacrylate (7.5 parts), lauryl mercaptan (3 parts), butyl acetate (53 parts) and the solution obtained in the above (4-2) are charged, and the reaction is carried out as in Example 1 to give a solution containing the resin. Viscosity, U.

(4-4) Preparation of paint composition:

The resin solution obtained in the above (4-3) is formulated into a paint composition as in Example 1. The composition is applied on a metal plate and heated at 180° C. for 30 minutes.

The test results of the coating film thus formed are as shown in Table 3.

TABLE 3

| Items | Results | Remarks |
|---|---|---|
| Gloss | 91 | Test methods and judgement are same as in Example 1. |
| Surface state | Good | |
| Hardness | 30 | |
| Impact resistance | 50 cm | |
| Erichsen extrusion | 4 mm | |
| Chemical resistance | | |
| Alkali | No change | |
| Acid | No change | |

EXAMPLE 5

(5-1) Preparation of partially blocked polyisocyanate compound:

In a flask, there is charged isophorone diisocyanate (444 parts), and methylethylketone oxime (174 parts) is dropwise added thereto in 2 hours at 60° C. After the dropwise addition is completed, the resultant mixture is heated at the same temperature as above for 2 hours. The reaction mixture is washed with n-hexane to extract unreacted diisocyanate. There is obtained a viscous liquid mainly containing methylethylketone oxime-monoblocked diisocyanate.

(5-2) Preparation of blocked isocyanate group-containing ethylenically unsaturated compound:

In a flask, there are charged the methylethylketone oxime-monoblocked diisocyanate obtained in the above (5-1) (189 parts), methyl methacrylate (130 parts) and p-benzoquinone (0.04 part), and 2-hydroxyethyl methacrylate (71 parts) is dropwise added thereto in 2 hours at 65° C. After the dropwise addition is completed, the resultant mixture is heated at the same temperature as above for 5 hours to give a pale yellow solution of the resultant blocked isocyanate group-containing ethylenically unsaturated compound.

(5-3) Preparation of blocked isocyanate group-containing self-hardening resin:

In a flask, 0.25% aqueous solution of hydroxypropyl methylcellulose ("Metrose 60SH" manufactured by Shinetsu Chemical Co., Ltd.) (1200 parts), methyl methacrylate (120 parts), styrene (72 parts), n-butyl acrylate (100 parts), 2-hydroxyethyl methacrylate (20 parts), t-dodecyl mercaptan (12 parts), 2,2'-azobis-2,4-dimethylvaleronitrile (16 parts) and the solution obtained in the above (5-2) (90 parts) are charged, and the resultant mixture is heated at 70° C. for 3 hours while stirring under nitrogen atmosphere. Then, the temperature is lowered to 65° C., and stirring is continued for 5 hours. The reaction mixture is washed with water and dried in a fluidizing layer dryer at 40° C. to make a suspension of the resin in beads of about 50 to 150 mesh. Weight average molecular weight, 72,000.

(5-4) Preparation of paint composition:

The resin obtained in the above (5-3) is crushed by the aid of a powdering machine ("Atomizer" manufactured by Fuji Industrial Co., Ltd.) and particles of larger than 100 mesh in size are eliminated to obtain a powder paint. The powder paint is applied on a metal plate by the aid of an electrostatic coating machine and heated at 180° C. for 30 minutes to give a coating film excellent in surface state, solvent resistance and chemical resistance.

Comparison

The reaction product of isophorone diisocyanate (111 parts) and methylethylketone oxime (87 parts) having a softening point lower than room temperature and acryl polyol are melt blended in an extruder, and the resulting blend is crushed in an "Atomizer" and particles of larger than 100 mesh in size are eliminated to obtain a powder paint being somewhat sticky. The powder paint is applied on a metal plate and heated at 180° C. for 30 minutes to give a coating film having a number of pinholes, which can not be practically evaluated.

EXAMPLE 6

(6-1) Preparation of partially blocked polyisocyanate compound:

In a flask, there are charged isophorone diisocyanate (555 parts) and p-benzoquinone (0.02 part), and 2-hydroxyethyl methacrylate (130 parts) is dropwise added thereto in 2 hours at 70° C. under nitrogen stream. After the dropwise additon is completed, the resultant mixture is heated at the same temperature as above for 8 hours. The reaction mixture is washed with n-hexane and purified as in Example 1 to give a butyl acetate solution of the partially blocked polyisocyanate.

(6-2) Preparation of blocked isocyanate group-containing ethylenically unsaturated compound:

In a flask, the butyl acetate solution obtained in the above (6-1) (241 parts) is charged, and m-cresol (54 parts) is dropwise added thereto. The reaction is carried out as in Example 1 to give a brown, viscous solution of the resultant blocked isocyanate group-containing ethylenically unsaturated compound.

(6-3) Preparation of blocked isocyanate group-containing self-hardening resin:

As in Example 3, a solution containing the resin is produced using the solution obtained in the above (6-2).

(6-4) Preparation of paint composition:

As in Example 3, a paint composition is prepared using the solution obtained in the above (6-3). The paint composition is applied on a metal plate to form a coating film, of which the properties are nearly same as those in Example 3.

EXAMPLE 7

(7-1) Preparation of partially blocked polyisocyanate compound:

In a flask, there is charged hexamethylene diisocyanate (336 parts), and methylethylketone oxime (174 parts) is dropwise added thereto in 3 hours at 70° C. After the dropwise addition is completed, the resultant mixture is heated at the same temperature as above for 2 hours. The reaction mixture is washed with a mixture of n-hexane and benzene (3:1 by weight) to extract unreacted diisocyanate. The residue is dissolved in ethyl acetate, and insoluble materials are eliminated. Removal of the ethyl acetate from the solution affords a yellow resin mainly consisting of methylethylketone oxime-monoblocked diisocyanate having a free isocyanate amount of $39.2 \times 10^{-4}$ mol/g.

(7-2) Preparation of blocked isocyanate group-containing ethylenically unsaturated compound:

In a flask, there are charged the resin obtained in the above (7-1) (128 parts), methyl methacrylate (130 parts) and p-benzoquinone (0.04 part), and 2-hydroxyethyl methacrylate (65 parts) is dropwise added thereto in 2 hours at 70° C. under nitrogen stream. After the dropwise addition is completed, the resultant mixture is heated at the same temperature for 8 hours to give a yellowish brown, transparent, viscous solution of the resultant blocked isocyanate group-containing ethylenically unsaturated compound.

(7-3) Preparation of blocked isocyanate group-containing self-hardening resin:

In a flask, 0.25% aqueous solution of hydroxypropyl methylcellulose ("Metrose 60SH" manufactured by Shinetsu Chemical Co., Ltd.) (1200 parts), methyl methacrylate (132 parts), styrene (88 parts), n-butyl methacrylate (60 parts), 2-hydroxyethyl methacrylate (20 parts), t-dodecyl mercaptan (24 parts), 2,2'-azobis-2,4-dimethylvaleronitrile (16 parts) and the solution obtained in the above (7-2) (100 parts) are charged, and the resulting mixture is heated at 70° C. while stirring for 3 hours under nitrogen atmosphere. Then, heating is continued at 65° C. for 5 hours. The reaction mixture is washed with water and dried in fluidizing layer dryer at 40° C. to give a polymer in beads of about 50 to 150 mesh in size having a number average molecular weight of 5,000 and a secondary transition point of 62° C.

(7-4) Preparation of paint composition:

The polymer obtained in the above (7-3) is crushed by the use of an "Atomizer", and particles of larger than 100 mesh are removed to give a powder paint (hereinafter referred to as "powder paint 7-A").

A mixture of the polymer obtained in the above (7-3) (300 parts) and rutile type titanium oxide (75 parts) is melt blended and pulverized in an extruder to give a powder paint (hereinafter referred to as "powder paint 7-B").

Hexamethylene diisocyanate (84 parts) and methylethylketone oxime (87 parts) are reacted at 70° C. for about 3 to 5 hours. When 100% of the free isocyanate groups is consumed, the temperature is lowered. The obtained totally blocked polyisocyanate compound is white, non-transparent solid. This product (50 parts) is admixed with acryl polyol resin (consisting of methyl methacrylate (208 parts), styrene (104 parts), n-butyl methacrylate (48 parts) and 2-hydroxyethyl methacrylate (40 parts)) (400 parts) and melt blended to give a powder paint (hereinafter referred to as "powder paint 7-C").

The powder paint 7-A (an embodiment of this invention) and the powder paint 7-C (for comparison) are respectively applied on zinc plated plates by the aid of an electrostatic coating machine and baked at 160°, 180° or 200° C. for 30 minutes. The coating film formed by the use of the powder paint 7-A is transparent and excellent in surface state, while that formed by the use of the powder paint 7-C is partially turbid and has pinholes.

The coating films as above formed are extracted with acetone for 5 hours in a Soxhlet extraction apparatus, and the weight percent of the insoluble materials is calculated. The results are shown in Table 4, from which it is understood that the powder paint 7-A is hardened at a lower temperature than the powder paint 7-C.

TABLE 4

| Paint compo- | Condition of baking | | |
|---|---|---|---|
| sition | 160° C. × 30 min. | 180° C. × 30 min. | 200° C. × 30 min. |
| 7 - A | 78% | 91% | 92% |
| 7 - C | 10% | 41% | 57% |

The powder paint 7-B is applied on an iron plate by the use of an electrostatic coating machine and baked at 180° C. for 30 minutes. The test results of the coating film thus formed are shown in Table 5, from which it is understood that the coating film is excellent in solvent resistance and chemical resistance.

TABLE 5

| Items | Results | Remarks |
|---|---|---|
| Gloss | 90 | Test methods and |
| Hardness | 31 | judgement are same |
| Impact resistance | 40 cm | as in Example 1. |
| Solvent resistance | No change | Immersed in ethyl acetate for 1 hour |
| Chemical resistance | | |
| Alkali | No change | Test methods and |
| Acid | No change | judgement are same as in Example 1. |

EXAMPLE 8

(8-1) Preparation of partially blocked polyisocyanate compound:

In a flask, there are charged hexamethylene diisocyanate (336 parts), n-butanol (118 parts) and triethylamine (2.2 parts), and the reaction is carried out at 80° C. for 5 hours. The reaction product is purified as in Example 7 to give a white, powdery solid mainly consisting of n-butanol-monoblocked diisocyanate having a free isocyanate amount of $41.3 \times 10^{-4}$ mol/g.

(8-2) Preparation of blocked isocyanate group-containing ethylenically unsaturated compound:

In a flask, there are charged the resin obtained in the above (8-1) (121 parts), methyl methacrylate (130 parts) and p-benzoquinone (0.04 part), and 2-hydroxyethyl methacrylate (65 parts) is dropwise added thereto at 70° C. in 2 hours under nitrogen atmosphere. After the dropwise addition is completed, the resultant mixture is heated at the same temperature as above for 12 hours, whereby a pale yellow substance having no free isocyanate group and being solid at room temperature is obtained.

(8-3) Preparation of blocked isocyanate group-containing self-hardening resin:

In a flask, 0.5% aqueous solution of hydroxypropyl methylcellulose (1200 parts), methyl methacrylate (132 parts), styrene (88 parts), n-butyl methacrylate (60 parts), 2-hydroxyethyl methacrylate (20 parts), t-dodecyl mercaptan (24 parts), 2,2'-azobis-2,4-dimethylvaleronitrile (16 parts) and the solid obtained in the above (8-2) (100 parts) are charged, and the resultant mixture is reacted and treated as in Example 7 to give a polymer in beads having a number average molecular weight of 4,000 and a secondary transition point of 55° C.

(8-4) Preparation of paint composition:

A mixture of the polymer obtained in the above (8-3) (300 parts), rutile type titanium oxide (75 parts) and dibutyltin dilaurate (1.0 part) is melt blended and crushed to make a powder paint.

The powder paint is applied on an iron plate and baked at 200° C. for 30 minutes to form a coating film which is excellent in surface state, chemical resistance and mechanical properties.

EXAMPLE 9

(9-1) Preparation of partially blocked polyisocyanate compound:

In a flask, there is charged isophorone diisocyanate (333 parts), and a mixture of m-cresol (227 parts) and triethylamine (3 parts) is dropwise added thereto. The reaction is carried out as in Example 7. The reaction product is washed with n-hexane and purified to give a brown, transparent solid mainly consisting of m-cresol-monoblocked diisocyanate having a free isocyanate amount of $30.3 \times 10^{-4}$ mol/g.

(9-2) Preparation of blocked isocyanate group-containing ethylenically unsaturated compound:

In a flask, there are charged the solid obtained in the above (9-1) (165 parts), styrene (130 parts) and p-benzoquinone (0.04 part), and 2-hydroxyethyl methacrylate (65 parts) is dropwise added thereto under nitrogen atmosphere as in Example 7 to give a brown, transparent, viscous liquid having no free isocyanate group.

(9-3) Preparation of blocked isocyanate group-containing self-hardening resin:

In a flask, there are charged water (1200 parts), disodium hydrogen phosphate (0.008 part) and zinc oxide (12 parts), and methyl methacrylate (124 parts), styrene (24 parts), n-butyl methacrylate (120 parts), 2-hydroxyethyl methacrylate (20 parts), t-dodecyl mercaptan (24 parts), 2,2'-azobis-2,4-dimethylvaleronitrile (16 parts) and the viscous liquid obtained in the above (9-2) (112 parts) are added thereto. After replacement of the atmosphere by nitrogen, the resultant mixture is heated at 70° C. for 8 hours while stirring. The reaction mixture is treated as in Example 7 to give a polymer in beads having a number average molecular weight of 2,500 and a secondary transition point of 40° C.

(9-4) Preparation of paint composition:

The polymer obtained in the above (9-3) is crushed by the aid of an atomizer, and particles of larger than 100 mesh are removed to give a powder paint (hereinafter referred to as "powder paint 9-A").

The polymer obtained in the above (9-3) (300 parts) and rutile type titanium oxide (75 parts) are melt blended and pulverized to make a powder paint (hereinafter referred to as "powder paint 9-B").

Isophorone diisocyanate (111 parts), m-cresol (108 parts) and triethylamine (1.4 parts) are subjected to reaction at 70° C. for about 3 hours, and when 100% of the free isocyanate group is consumed, the temperature is lowered to give a brown, transparent solid, which is washed to eliminate the triethylamine and dried under reduced pressure. The solid (64 parts) and acryl polyol resin (consisting of methyl methacrylate (180 parts), styrene (88 parts), n-butyl methacrylate (92 parts) and 2-hydroxyethyl methacrylate (40 parts)) (400 parts) are melt blended and crushed to make a powder paint (hereinafter referred to as "powder paint 9-C").

The powder paint 9-A (an embodiment of this invention) and the powder paint 9-C (for comparison) are respectively applied on zinc plated plates by the aid of an electrostatic coating machine and baked at 180°, 200° and 220° C. for 30 minutes. The coating film formed by the use of the powder paint 9-A is transparent at all and has gloss, while that formed by the use of the powder paint 9-C is partially turbid and has pinholes.

The coating films as above formed are extracted with acetone, and the weight percent of the insoluble materials is calculated. The results are shown in Table 6, from which it is understood that the powder paint 9-A is hardened at a lower temperature than the powder paint 9-C.

TABLE 6

| Paint composition | Condition of baking | | |
| --- | --- | --- | --- |
| | 180° C. × 30 min. | 200° C. × 30 min. | 220° C. × 30 min. |
| 9 - A | 30% | 88% | 93% |
| 9 - C | 2% | 5% | 12% |

The powder paint 9-B is applied on an iron plate by the use of an electrostatic coating machine and baked at 200° C. for 30 minutes. The test results of the coating film thus formed are shown in Table 7, from which it is understood that the coating film is excellent in solvent resistance and chemical resistance.

TABLE 7

| Items | Results | Remarks |
| --- | --- | --- |
| Gloss | 91 | Test methods and judgement are same as in Example 7. |
| Hardness | 33 | |
| Impact resistance | 25 cm | |
| Solvent resistance | No change | |
| Chemical resistance | | |
| Alkali | No change | |
| Acid | No change | |

EXAMPLE 10

(10-1) Preparation of partially blocked polyisocyanate compound:

In a flask, there is charged isophorone diisocyanate (666 parts), and methylethylketone oxime (261 parts) is dropwise added thereto at 60° C. in 2 hours. After the dropwise addition is completed, the resultant mixture is heated at the same temperature as above for 2 hours. The reaction product is washed with n-hexane to eliminate unreacted diisocyanate and purified as in Example 7 to give a yellow resinous material consisting mainly methylethylketone oxime-monoblocked diisocyanate having a free isocyanate amount of $32.3 \times 10^{-4}$ mol/g.

(10-2) Preparation of blocked isocyanate group-containing ethylenically unsaturated compound:

In a flask, there are charged N-methylolacrylamide (51 parts), methyl methacrylate (65 parts) and p-benzoquinone (0.04 part), and a mixture of the resinous material obtained in the above (10-1) (155 parts) and methyl methacrylate (65 parts) is dropwise added thereto at 80° C. in 2 hours under nitrogen atmosphere. After the dropwise addition is completed, the resultant mixture is heated at the same temperature as above for 8 hours to give a reddish brown, transparent, viscous liquid having no free isocyanate group.

(10-3) Preparation of blocked isocyanate group-containing self-hardening resin:

In a flask, there are charged 0.25% aqueous solution of hydroxypropyl methylcellulose (1200 parts), methyl methacrylate (92 parts), styrene (64 parts), n-butyl methacrylate (120 parts), 2-hydroxyethyl methacrylate (20 parts), t-dodecyl mercaptan (24 parts), 2,2'-azobis-2,4-dimethylvaleronitrile (16 parts) and a solution of the viscous liquid obtained in the above (10-2) in methyl methacrylate (104 parts), and the resulting mixture is treated as in Example 7 under nitrogen atmosphere to give a polymer in beads having a number average molecular weight of 6,000 and a secondary transition point of 50° C.

(10-4) Preparation of paint composition:

The polymer obtained in the above (10-3) is treated as in Example 7 to give a powder paint (hereinafter referred to as "powder paint 10-A").

The polymer obtained in the above (10-3) (300 parts) is melt blended with rutile type titanium oxide (75 parts), and the resultant mixture is crushed to make a powder paint (herein after referred to as "powder paint 10-B").

Isophorone diisocyanate (111 parts) and methylethylketone oxime (87 parts) are reacted as in Example 7 and, when 100% of the free isocyanate groups is consumed, the temperature is lowered to give a pale yellow, transparent resinous material. The resinous material (58 parts) and acryl polyol resin (consisting of methyl methacrylate (180 parts), styrene (92 parts), n-butyl methacrylate (92 parts), N-methylolacrylamide (16 parts) and 2-hydroxyethyl methacrylate (20 parts)) (400 parts) are melt blended and crushed to make a powder paint (hereinafter referred to as "powder paint 10-C").

The powder paint 10-A (an embodiment of this invention) and the powder paint 10-C (for comparison) are respectively applied on zinc plated plates by the aid of an electrostatic coating machine and baked at 160°, 180° and 200° C. for 30 minutes. The thus formed coating films are extracted with acetone, and the weight percent of the insoluble materials is calculated. The results are shown in Table 8, from which it is understood that the powder paint 10-A is hardened at a lower temperature than the powder paint 10-C.

TABLE 8

| Paint composition | Condition of baking | | |
|---|---|---|---|
| | 160° C. × 30 min. | 180° C. × 30 min. | 200° C. × 30 min. |
| 10 - A | 80% | 91% | 92% |
| 10 - C | 5% | 63% | 79% |

The powder paint 10-B is applied on an iron plate by the use of an electrostatic coating machine and baked at 180° C. for 30 minutes. The test results of the coating film thus formed are shown in Table 9, from which it is understood that the coating film is excellent in solvent resistance and chemical resistance.

TABLE 9

| Items | Results | Remarks |
|---|---|---|
| Gloss | 87 | Test methods and |
| Hardness | 31 | judgement are same |
| Impact resistance | 50 cm | as in Example 7. |
| Solvent resistance | No change | |
| Chemical resistance | | |
| Alkali | No change | |
| Acid | No change | |

EXAMPLE 11

(11-1) Preparation of partially blocked polyisocyanate compound:

In a flask, there are charged isophorone diisocyanate (555 parts) and p-benzoquinone (0.02 part), and 2-hydroxyethyl methacrylate (130 parts) is dropwise added thereto at 70° C. in 2 hours under nitrogen atmosphere. After the dropwise addition is completed, the resultant mixture is heated at the same temperature as above for 8 hours. The reaction product is washed with n-hexane and purified as in Example 7 to give a colorless, transparent, resinous material mainly consisting of 2-hydroxyethyl methacrylate-monoblocked diisocyanate having a free isocyanate amount of $28.6 \times 10^{-4}$ mol/g.

(11-2) Preparation of blocked isocyanate group-containing ethylenically unsaturated compound:

In a flask, the resinous material obtained in the above (11-1) (176 parts), methyl methacrylate (130 parts) and p-benzoquinone (0.04 part) are charged, and m-cresol (54 parts) is dropwise added thereto under nitrogen atmosphere. The reaction is carried out as in Example 7 to give a brown, transparent, viscous solution containing the objective compound having no free isocyanate group.

(11-3) Preparation of blocked isocyanate group-containing self-hardening resin:

As in Example 9 but using the solution obtained in the above (11-2), there is prepared a self-hardening resin.

(11-4) Preparation of paint composition:

As in Example 9 but using the resin obtained in the above (11-3), there is prepared a paint.

The coating film formed by the use of the paint does not show any material difference from that in Example 9 in various properties.

What is claimed is:

1. A process for producing a self-hardening polymer which comprises subjecting to polymerization at 40° to 100° C. a mixture comprising:
   (A) a blocked isocyanate group-containing ethylenically unsaturated polymerizable compound and (B) an active hydrogen atom-containing ethylenically unsaturated compound selected from the group consisting of an unsaturated hydroxyalkyl compound, an unsaturated carboxylic acid and an unsaturated carboxylic acid amide, the ratio of blocked isocyanate groups in component (A) to one active hydrogen atom in component (B) being 0.2 to 2, component (A) being obtained by:

(1) addition of an unsaturated hydroxyalkyl compound, an unsaturated carboxylic acid or an unsaturated carboxylic acid amide to a polyisocyanate compound, prepared by reacting a polyisocyanate with a blocking agent in a proportion of 0.01 to 0.8 of the active hydrogen atom in the blocking agent to one isocyanate group in the polyisocyanate, or (2) addition of a blocking agent to an ethylenically unsaturated monomer containing an isocyanate group, prepared by addition of an unsaturated hydroxyalkyl compound, an unsaturated carboxylic acid or an unsaturated carboxylic acid amide to a polyisocyanate, said polyisocyanate being:

hexamethylene diisocyanate, ethylene diisocyanate, propylene diisocyanate, tetramethylene diisocyanate, decamethylene diisocyanate, triphenylmethane triisocyanate, 4,4'-ethylene-bis-(cyclohexylisocyanate), 4,4'-methylene-bis(cyclohexylisocyanate), $\omega,\omega'$-diisocyanate-1,3-dimethylbenzene, phenylene diisocyanate, lysine diisocyanate methyl ester, isophorone diisocyanate, trimethylhexamethylene diisocyanate, diphenylmethane-4,4'-diisocyanate or 3,3'-dimethyldiphenylmethane-4,4'-diisocyanate or their adducts with ethylene glycol, diethylene glycol, propylene glycol, trimethylolpropane, hexamethylene glycol, 1,3-butylene glycol, cyclohexanedimethanol, neopentyl glycol or pentaerythritol, their biuret type compounds or their allophanate type compounds.

* * * * *